Oct. 7, 1952     C. E. TRUITT     2,613,018
DEVICE FOR DISPENSING GRANULAR MATERIALS IN PREDETERMINED BULK
QUANTITIES, HAVING A MEASURING COMPARTMENT AND A VALVE
Filed Aug. 13, 1951

Charles E. Truitt
INVENTOR

BY C. A. Snow & Co.
ATTORNEYS

Patented Oct. 7, 1952

2,613,018

UNITED STATES PATENT OFFICE 2,613,018

DEVICE FOR DISPENSING GRANULAR MATERIALS IN PREDETERMINED BULK QUANTITIES, HAVING A MEASURING COMPARTMENT AND A VALVE

Charles E. Truitt, Springfield, Ill.

Application August 13, 1951, Serial No. 241,607

1 Claim. (Cl. 222—452)

This invention relates to dispensing devices, and more particularly to dispensing devices designed primarily for dispensing granular materials such as coffee, sugar or the like, in predetermined bulk quantities.

An important object of the invention is to provide a dispensing device of this character wherein a predetermined quantity of material may be dispensed with each operation of the valve, thereby insuring the exact quantity of material being dispensed.

A further object of the invention is to provide a clearance passageway adjacent to and in communication with the measuring compartment, through which granules may be by-passed to the measuring compartment, and which would otherwise find their way into the space between the body portion of the measuring device and casing, in which the valve operates, and retard operation of the valve within the valve housing.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figure 1:
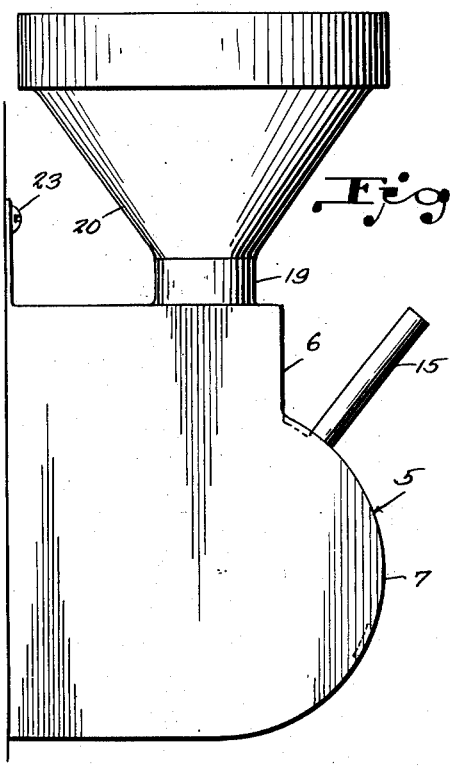
Figure 1 is a side elevational view of a dispensing device constructed in accordance with the invention.
Figure 2:
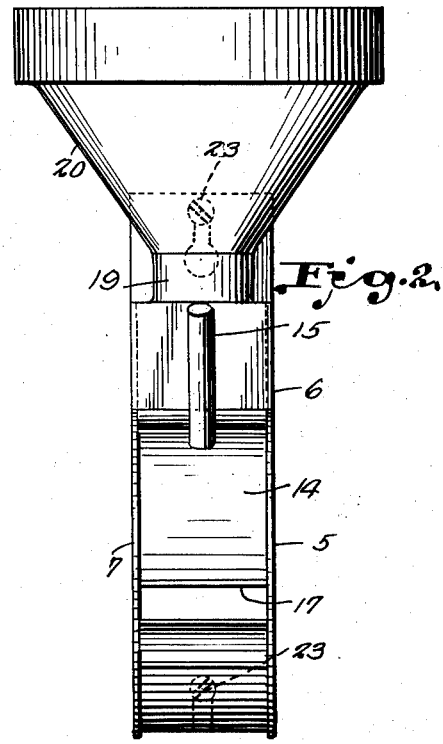
Fig. 2 is a front elevational view thereof.

Referring to the drawing in detail, the device comprises a body portion indicated generally by the reference character 5, the body portion including a lower section 6 which has a curved forward wall 7 that cooperates with the arcuate-shaped partition 8 in providing a circular housing, within the body portion.

Also supported within the lower section, is the curved section 9, the curved section 9 having a vertical wall 10 formed interiorly thereof, the wall 10 cooperating with the vertical wall 11 and providing a measuring compartment.

Figure 3:
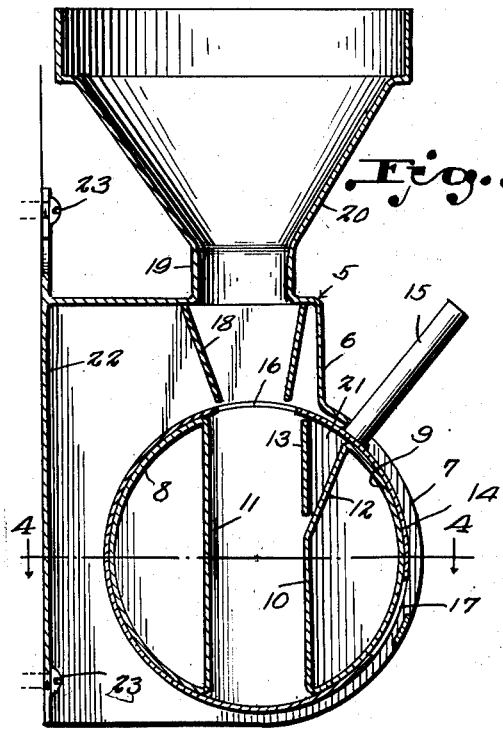
Fig. 3 is a vertical sectional view through the device.
Figure 4:
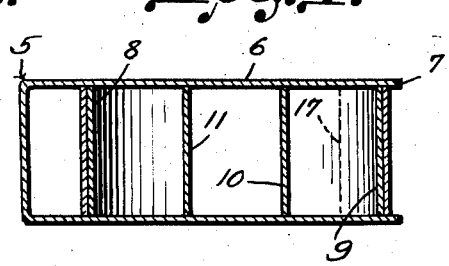
Fig. 4 is a sectional view taken on line 4—4 of Fig. 3.

As clearly shown by Fig. 3 of the drawing, the vertical wall 10 is formed with an upper section 12 which is disposed at an oblique angle, and cooperating with this section 12 is a vertical partition 13 that has its lower end spaced from the lower end of the wall 12, providing a passageway between the space formed between the portions 12 and 13, and the measuring compartment of the device.

The upper and lower ends of the measuring compartment are open, so that granular material directed thereto, can pass into the measuring compartment.

Operating between the curved section 9 and arcuate portion 8, is the valve indicated generally by the reference character 14, the valve being in the form of a wide flange which is of a thickness to closely fit between the space between the curved section 9, arcuate portion 8, and curved section of the body portion.

The forward section of the body portion is formed with an elongated opening through which the operating rod 15 extends, the operating rod being secured to the valve 14, as clearly shown by Fig. 3 of the drawing.

The valve 14 is provided with an entrance opening 16, and an outlet opening 17, and in the position as shown by Fig. 3 of the drawing, the opening 16 is directly under the spout 18 which extends throughout the width of the body portion, and is disposed directly under the discharge end 19 of the hopper 20, so that granular material deposited in the hopper, will be fed through the hopper and the spout, directly into the measuring compartment of the device.

It will be seen that when the valve is in a position to permit granular material to pass into the measuring compartment thereof, a portion of the valve will close the upper end of the passageway 21, formed between the section 12 and vertical partition 13. However, when the valve has been moved to cut off the passage of granular material to the measuring compartment, it will be obvious that a section of the valve which normally closes the passageway 21, will move to a position allowing granules which would otherwise find their way between the valve and opening in which the valve operates, into the measuring compartment, thereby providing a valve which may operate freely at all times and will not be retarded in its movement by granules which would otherwise cause a binding of the valve.

The body portion includes a rear wall 22 which is provided with openings to receive the securing screws 23, whereby the device may be readily and easily secured to a supporting wall or surface.

From the foregoing it will be seen that due to the construction shown and described, I have provided a measuring device designed primarily for measuring and dispensing predetermined quantities in bulk, and in operation, the valve is moved to the position as shown by Fig. 3 of the drawing, whereupon the granular material will fall by gravity into the measuring compartment of the lower section. When the measuring compartment is filled, the valve is rotated moving the outlet opening 17 thereof into registry with the lower end of the measuring compartment, whereupon the material may be deposited in a suitable container held directly thereunder.

Having thus described the invention, what is claimed is:

In a device for measuring and dispensing granular material, a body including an upper hopper and a lower section having an open-ended measuring compartment mounted therein in spaced relation with the wall of the lower section, a spout within said lower section located adjacent to the lower end of the hopper, through which material is directed from the hopper to the measuring compartment, a rotary valve operating in the space between the wall of the lower section and measuring compartment, said valve having an inlet opening and an outlet opening adapted to align with the open ends of the measuring compartment, controlling the passage of material to and from the measuring compartment, and a passageway within the housing communicating with the measuring compartment through which the granular material is directed from said space between the wall of the lower section and measuring compartment, into the measuring compartment.

CHARLES E. TRUITT.

REFERENCES CITED

The following references are of record in the file of this patent:

UNITED STATES PATENTS

| Number | Name | Date |
|---|---|---|
| 2,072,760 | Ludwig | Mar. 2, 1937 |